(12) United States Patent
Moore (10) Patent No.: US 8,380,552 B2
(45) Date of Patent: Feb. 19, 2013

(54) METHOD AND SYSTEM FOR ESTIMATING PROJECT DELAY

(75) Inventor: Devin Moore, Lewis Center, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 552 days.

(21) Appl. No.: 12/635,864

(22) Filed: Dec. 11, 2009

(65) Prior Publication Data

US 2011/0145034 A1    Jun. 16, 2011

(51) Int. Cl.
*G06Q 10/00* (2012.01)
(52) U.S. Cl. ...................................... 705/7.12
(58) Field of Classification Search .................. 705/7.12
See application file for complete search history.

(56) References Cited

U.S. PATENT DOCUMENTS

| | | | | |
|---|---|---|---|---|
| 6,370,567 | B1 * | 4/2002 | Ouchi ........................... | 709/206 |
| 7,007,067 | B1 * | 2/2006 | Azvine et al. ................. | 709/206 |
| 7,216,088 | B1 * | 5/2007 | Chappel et al. .............. | 705/7.17 |
| 7,512,659 | B2 * | 3/2009 | Keohane et al. .............. | 709/206 |
| 8,161,122 | B2 * | 4/2012 | Sood et al. ................... | 709/206 |
| 2002/0156668 | A1 * | 10/2002 | Morrow et al. ................... | 705/8 |
| 2006/0069605 | A1 * | 3/2006 | Hatoun ............................ | 705/9 |
| 2008/0288322 | A1 * | 11/2008 | Kennedy et al. .................. | 705/9 |
| 2010/0211592 | A1 * | 8/2010 | Brownlee ....................... | 707/769 |
| 2010/0250682 | A1 * | 9/2010 | Goldberg et al. ............. | 709/206 |

OTHER PUBLICATIONS

Di Penta, M.; Harman, M.; Antoniol, G.; Qureshi, F.; , "The Effect of Communication Overhead on Software Maintenance Project Staffing: a Search-Based Approach," Software Maintenance, 2007. ICSM 2007. IEEE International Conference on , vol., No., pp. 315-324, Oct. 2-5, 2007 doi: 10.1109/ICSM.2007.4362644.*

Simmons, D.B.; , "Communications: a software group productivity dominator," Software Engineering Journal , vol. 6, No. 6, pp. 454-462, Nov. 1991 URL: http://ieeexplore.ieee.org/stamp/stamp.jsp?tp=&arnumber=120430&isnumber=3440.*

Avritzer, A.; Lima, A.; , "An Empirical Approach for the Assessment of Scheduling Risk in a Large Globally Distributed Industrial Software Project," Global Software Engineering, 2009. ICGSE 2009. Fourth IEEE International Conference on , vol., No., pp. 341-346, Jul. 13-16, 2009 doi: 10.1109/ICGSE.2009.53j.*

Espinosa, J. Alberto and Carmel, Erran. "The impact of time separation on coordination in global software teams: a conceptual foundation." Software Process: Improvement and Practice, vol. 8, Issue 4, pp. 249-266, Oct./Dec. 2003, doi: 10.1002/spip.185.*

Jorge Cardoso, Amit Sheth, John Miller, Jonathan Arnold, and Krys Kochut. "Quality of service for workflows and web service processes." Web Semantics: Science, Services and Agents on the World Wide Web 1 (2004) 281-308. doi:10.1016/j.websem.2004.03.001.*

Jorge Cardoso, Amit P. Sheth, and John Miller. 2002. Workflow Quality of Service. In Proceedings of the IFIP TC5/WG5.12 International Conference on Enterprise Integration and Modeling Technique: Enterprise Inter- and Intra-Organizational Integration: Building International Consensus (ICEIMT '01), Kurt Kosanke, Roland Jochem, James G. Nell, and Ange.*

Michael Jay Douglas. "The Impacts of the Handoffs on Software Development: A Cost Estimate Model", Doctoral Dissertation, May 8, 2006. University of South Florida.*

* cited by examiner

*Primary Examiner* — Peter Choi
*Assistant Examiner* — George H Walker (57) ABSTRACT

An approach is provided for determining an estimated completion time for a task and/or a project. A plurality of electronic communications of a plurality of users are accessed, wherein the electronic communications relate to a common project engaged in by the users. Timing information is extracted from the electronic communications. For each of the users, an average delay period is computed using the extracted timing information. An estimated delay value is generated for the project based on the computed average delay periods.

12 Claims, 6 Drawing Sheets

METHOD AND SYSTEM FOR ESTIMATING PROJECT DELAY

BACKGROUND INFORMATION

Determining the time expected to complete a task or a project with high accuracy is an important element for an organization and its clients, for example, in order to plan accurately for budget, resources, future projects, etc. As companies and organizations grow and the tasks and projects they handle get more complicated, the number of individuals and systems that are engaged in these tasks and projects also increases accordingly. Further, as these organizations move toward globalization, individuals and systems involved in the tasks and projects handled by these organizations can be located around the world. Unfortunately, current systems do not offer an approach for accurately determining delays associated with projects and tasks. Project management tools can track workflows and dates of projects, even complex ones; however, they have been ineffective in accounting for delays stemming from actual factors that contribute to project delays. That is, there is no capability for these project management tools to monitor the causes of the delays, which is infeasible in terms of administration and cost.

Therefore, there is a need for an approach to accurately determine delays, and thus, to provide effective estimates of project completion times.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for estimating project delay are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
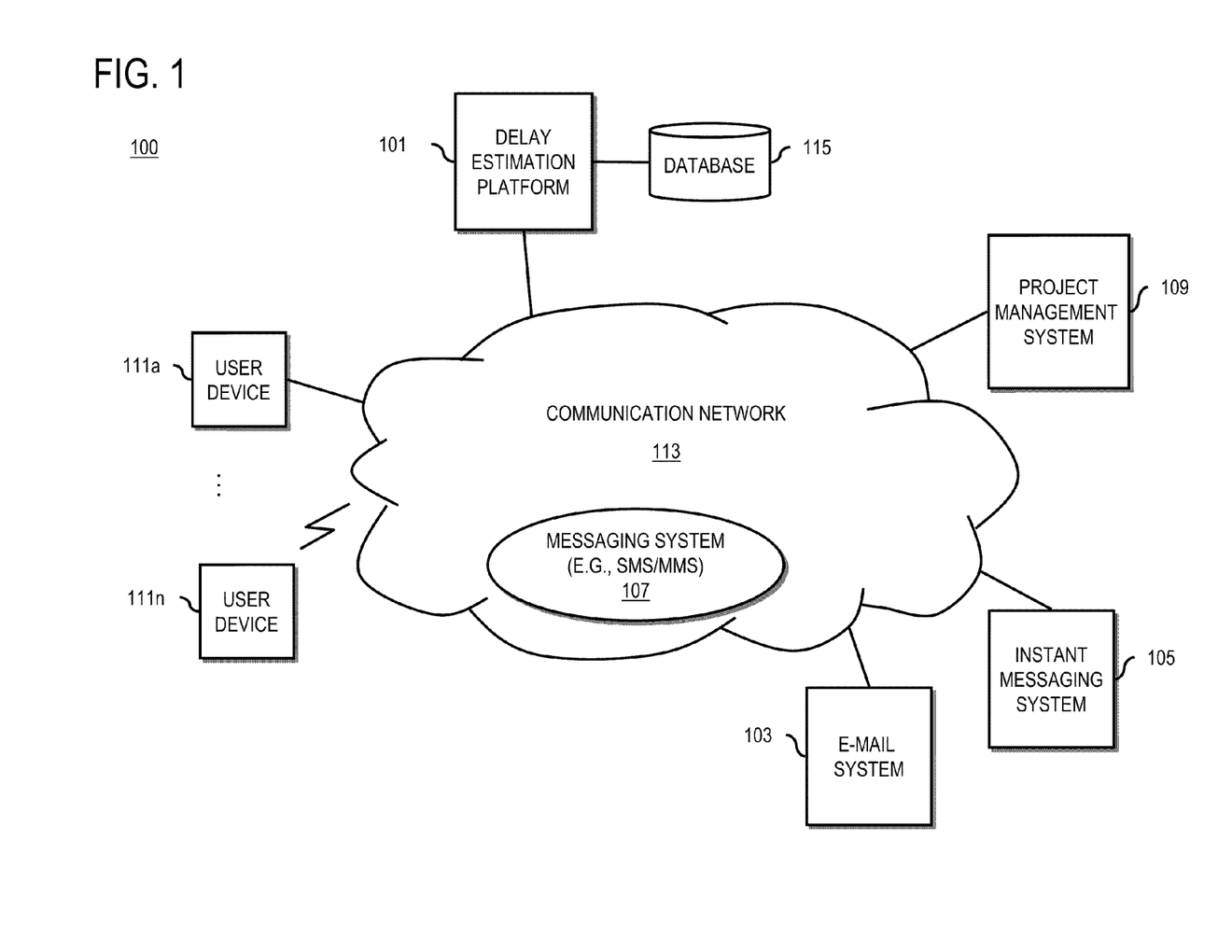
FIG. 1 is a diagram of a system capable of estimating delay for a task and/or a project, according to an exemplary embodiment.

FIG. 1 is a diagram of a system capable of estimating delay for a task and/or a project, according to an exemplary embodiment. As shown, system 100 can accurately determine delays associated with a project in order to compute completion time of the project. System 100 includes a delay estimation platform 101 configured to calculate a project completion time by accessing, for example, a list of individuals and/or systems (or processes) that are involved in a project (and/or a task). As used herein, individuals (or users), processes, or systems constitute items, whereby individuals/systems and individual/processes are used interchangeably. The platform 101 determines, for example, average background delay periods for the individuals and/or systems engaged in the project; this delay information is then utilized to estimate the project completion date, or deadline.

An important element in estimating completion time for a task and/or a project involves effective data collection as well as selection of the type of data to consider. Collecting appropriate data that conveys timing information associated with realistic workflows is paramount. It is recognized that the communications among individuals and/or processes that are involved in the project can provide an accurate source for attributing delays.

To address this issue, the delay estimation platform 101 can be configured to access electronic communication systems (e.g., e-mail system 103, instant messaging system 105, messaging system 107, and any system that supports time based transactions) involved with the project. In one exemplary embodiment, the delay estimation platform 101 can collect or access a list of individuals and/or systems engaged in the project. These individuals and systems can be referred to by user identifiers and system identifiers, respectively. In one exemplary embodiment, the average background delay period associated with each individual and/or processes can indicate the level of availability of that individual and/or system (i.e., how busy the individual and/or system), therefore, can specify an estimate of a delay period associated with that individual and/or system to start working on the project and/or to communicate with other individuals and/or systems engaged in the project (e.g., turnaround time).

With respect to the individuals involved in the project, to estimate the average background delay period for one person, the delay estimation platform 101 can use any time based transaction and/or electronic communication associated with that person. For example, the delay estimation platform 101 can access the electronic communication systems (such as e-mail system 103, instant messaging system 105, and messaging system 107) and perform a search to determine electronic communications associated with that individual. Further, according to one exemplary embodiment, the delay estimation platform 101 can classify and/or categorize the electronic communications associated with the user (via a user identifier) based on sender/recipient, subject of the electronic communication, sent/received time, etc.

Thus, the delay estimation platform 101 can determine a "response" time associated with the user identifier for one or more electronic communications based on the sender/recipient and sent/received time according to the subject of the electronic communication. In essence, response time can represent a period in which the user communicates with another user or system relating to the common task/project. According to certain embodiments, the response times are determined based on time stamps associated with the electronic communication. Also, the platform 101 can parse the electronic communication, e.g., email, to determine that indeed the communication relates to a common task, and that the sender and recipient are members assigned to the task/project (i.e., task or project identifier). The time period from when the recipient responds to the email from the send will provide some indication of delay relating to the project.

As noted, the delay estimation platform 101 can interface different electronic communication systems, e.g., e-mail system 103, instant messaging system 105, and messaging system 107. The messaging system 107, in one embodiment, can be part of the communication network 113, and can provide, but not limited to, a short message service (SMS) service, multimedia messaging service (MMS) service, etc. Although only systems 103, 105, and 107 are shown, it is contemplated that any electronic communication system that can support time based transactions can be used. The delay estimation platform 101 can collect information about these transactions and communications for each individual (e.g., person) involved in the project, and determine a response time based on that individual communications accessed form the electronic communication systems (such as e-mail system 103, instant messaging system 105, and messaging system 107).

Also, the delay estimation platform 101 can be configured to communicate with other productivity applications/tools or systems, e.g., project management system 109 to retrieve timing data corresponding to various communications. The project management system 109, among other features and functions, can collect the estimated delay data from the platform 101 and factor in such data into computing project status and completion times and dates. The project management system 109 is more fully described below.

As illustrated in FIG. 1, system 100 can include one or more user devices 111a-111n. The user devices 111a-111n can be used by one or more individuals (e.g., users) involved in the project. Alternatively or additionally, the user devices 111a-111n can include applications that participate in the project; that is, these applications can impact the deadline of the project.

In the exemplary embodiment of FIG. 1, a communication network 113 supports necessary communication between different elements of system 100. The communication network 113 may include one or more networks such as a data network and/or a telephony network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network can be provided via a combination of circuit-switched technologies or a packetized voice infrastructure.

For the purpose of illustration, the communication network 113 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth, ultra-wideband (UWB), the IEEE 802.22 standard, etc.

As described, the delay estimation platform 101, according to one exemplary embodiment, can determine background delay for a particular individual (involved in the task or project) using the collected response times. In one example, the determined response times are added to a total response time; and the total response time is divided by the number of electronic communications associated with the determined response times. Additionally or alternatively, response times calculated for different communication channels can be averaged according to a weighting scheme to compute the average delay period for that person. For example, determined response times associated with the e-mail system 103 can have more importance (more weight) in calculation of the average delay period in comparison to determined response times associated with the instant messaging system 105. In one example, the electronic communications can also be filtered based on their subject to determine different types of delays.

According to one exemplary embodiment, the delay estimation platform 101 can also be configured to perform different statistical analysis on determined response times. For example, the delay estimation platform 101, for an individual involved in the project, can determine a range of response times, the smallest and the largest response time, a variance for response times, a probability distribution associated with the response times, a graph illustrating response times, etc.

In addition to determining background delay periods associated with individuals involved in the project, the delay estimation platform 101, according to one exemplary embodiment, is further configured to determine average background delay periods associated with systems that are engaged in the project. Although systems average background delay periods may be smaller that average background delay periods associated with individuals, they can, however, be used to calculate more accurate estimate completion time for the project. Examples of system average background delay periods can include, but not limited to, system response time, central processing unit (CPU) processing time, simulation delays, software testing delays, etc. In one exemplary embodiment of FIG. 1, one or more user devices 111a-111n can include one or more systems involved in the project. The delay estimation platform 101 can be coupled to the user devices 111a-111n through the communication network 113 and can be configured to determine average background delay periods associated with the systems. As mentioned, the delay estimation platform 101 can further perform additional statistical analysis on the determined response times.

In one exemplary embodiment, the delay estimation platform 101 can be implemented and operate as a centralized platform (i.e., a managed service or "hosted" solution). Alternatively, the delay estimation platform 101 can be implemented as a distributed platform. According to this exemplary embodiment, the delay estimation platform 101 can include distributed platforms located at local user devices, local systems, and/or local offices. In this example, the distributed platform can access systems involved in the project locally and can locally access the electronic communications and/or local electronic communication systems associated with the individuals engaged in the project. For example, a module or platform associated with the delay estimation platform 101 can be placed in a user device (such as one of user devices 111a-111n) of an individual engaged in the project and can access the electronic communications (such as e-mail, instant messages, SMS/MMS, voice messages, call log, etc.) of that individual locally.

In one embodiment, the process of determining delays for systems and/or individuals engaged in a project and/or a task can be performed when the project and/or task is defined. Additionally or alternatively, the delay estimation platform 101 can determine and update average background delay periods dynamically during the course of completion of the project. Further, the delay estimation platform 101 can be coupled to a database 115 to store and/or access timing information collected from the systems 103, 105, and 107.

Further, the delay estimation platform 101 can be configured to collect and/or determine other information to calculate estimate completion time for the project. In one embodiment, the delay estimation platform 101 can collect and/or determine an estimated time period, for each individual engaged in the project, to complete the individual's part of the project. For example, the delay estimation platform 101 can obtain this estimated time period from the individuals engaged in the project. Additionally or alternatively, the delay estimation platform 101 can access and/or determine average estimated time periods, based on previous projects associated with the individuals; such information may be made available in the database 115 and/or the project management system 109.

As mentioned, the delay estimation platform 101 can be coupled to the project management system 109 through the communication network 113. The delay estimation platform 101 can utilize the estimated time periods to determine a version of completion time for the project without considering background delay periods. This version of completion time can be combined with average background delay periods computed by the delay estimation platform 101 to determine estimate completion time.

The project management system 109 can include various platforms used in organization for defining projects, planning resources, managing budget, providing communications, scheduling, providing documentations, quality control, monitoring and controlling progress of projects, etc. Platforms and modules included in the project management system 109 may be centralized, distributed, web-based, personal, collaborative, etc., according to certain embodiments. Examples of platforms and/or modules that can be used in the project management system 109 can include, but not limited to, Microsoft Office Enterprise Project Management® (EPM) provided by Microsoft®, Agile® provided by IBM®, etc.

Also, the project management system 109 can include various information data regarding previous projects and/or tasks completed in the organization. These information data, which can include, but not limited to individuals and/or systems engaged in previous projects, number of electronic communications and/or services corresponding to each individual and/or system, engagement share of each individual and/or system in previous project, etc., can be used by the delay estimation platform 101 advantageously to improve the estimate completion time of the current project. Additionally or alternatively, information data associated with previous projects can be stored in database 115 coupled to the delay estimation platform 101.

Moreover, the delay estimation platform 101 can determine, for each system and/or individual engaged in the project, a project dependency parameter. This project dependency parameter relates to how much the project is dependent on each system and/or individual; that is, this parameter specifies the degree of dependency of the project on the process or user. According to one embodiment, the parameter is a predetermined value that is set by the project management system 109, or manually configured. Alternatively, the delay estimation platform 101 can determine an average project dependency parameter based on previous projects that the particular system and/or individual have participated—e.g., total number of electronic communications divided by the number of users and/or processes. In another example, the project dependency parameter can be input to the delay estimation platform 101 by a system or user (such as the individual, a project manager, etc). The project dependency parameter can be used to estimate completion time of the project by considering each system and/or individual's participation share in the project.

Further, the delay estimation platform 101, in order to compute the estimate completion time of the project, can determine average number of electronic communications for each individual engaged in the project, based on information historical data associated with past projects stored at the database 115 and/or project management system 109. In one exemplary embodiment, the delay estimation platform 101 can access the information data of past projects associated with an individual, can determine total number of electronic communications associated with that individual in each of the past projects, and can compute an average number of electronic communications. According to an exemplary embodiment, average number of electronic communications associated with an individual and average background delay period associated with that individual (for each communication) can provide a better estimate of total background delay period for that individual in course of completion of the project. In addition to determining average number of electronic communications for individuals engaged in the project, the delay estimation platform 101 is enabled to determine average number of services provided by the systems involved in the project by accessing database 115 and/or project management system 109.

According to an exemplary embodiment, the delay estimation platform 101 is capable of determining and/or receiving a determination regarding grouping of the systems and/or individuals engaged in the project. In this manner, the estimate completion time for the project can be determined and/or updated based on this grouping. The delay estimation platform 101 may determine importance of systems and/or individuals in the project by, for example, determining a group of systems and/or individuals as a core piece of the project and a group of systems and/or individuals as an optional piece of the project. Therefore, in this example, the estimate completion time for the project can be calculated based on the core group of the project.

Advantageously, by determining and/or collecting timing data, such as average background delays, estimated time period of each system and/or individual to complete its task (if that system and/or individual has information needed available), project dependency parameters, average number of electronic communications and/or services in a project, etc., the delay estimation platform 101 can determine an estimate completion time for a project more accurately and in a way that coincides with actual business workflows. Greater accuracy of the completion time can prevent setting unrealistic hard deadlines (that may not be achievable), and therefore, can provide managers, customers, clients, etc. a better understanding of how long the project may take to be completed.

The delay estimation platform 101 can, according to some embodiments, dynamically update the estimated completion time during the course of the project. The update procedure, for example, can be initiated according to a schedule (or be based on an event). Additionally or alternatively, the update process can be initiated on-demand—i.e., in response to a request. For example, the update process can be initiated if number of systems and/or individuals engaged in the project changes, new information regarding average background delays, estimated time period for each system and/or individual to complete its task, project dependency parameters, average number of electronic communications in a project, etc. are updated, tasks are added or removed from the project, etc.

According to certain embodiment, the delay estimation platform 101 provides the capability to present a user interface to users (such as managers, clients, etc.) to provide them with the estimate completion time for project and further, to offer them more detailed calculations. One or more user devices 111a-111n can include a display for presenting the graphical user interface (GUI) that can provide an environment to provide the estimate completion time for the current project, to allow updates to systems and/or individuals engaged in current project, etc.

Although few exemplary processes have been described, it is contemplated that other procedures and calculations can be provided by the delay estimation platform 101 to more accurately determine an estimate completion time for projects with more realistic implications.

Figure 2:
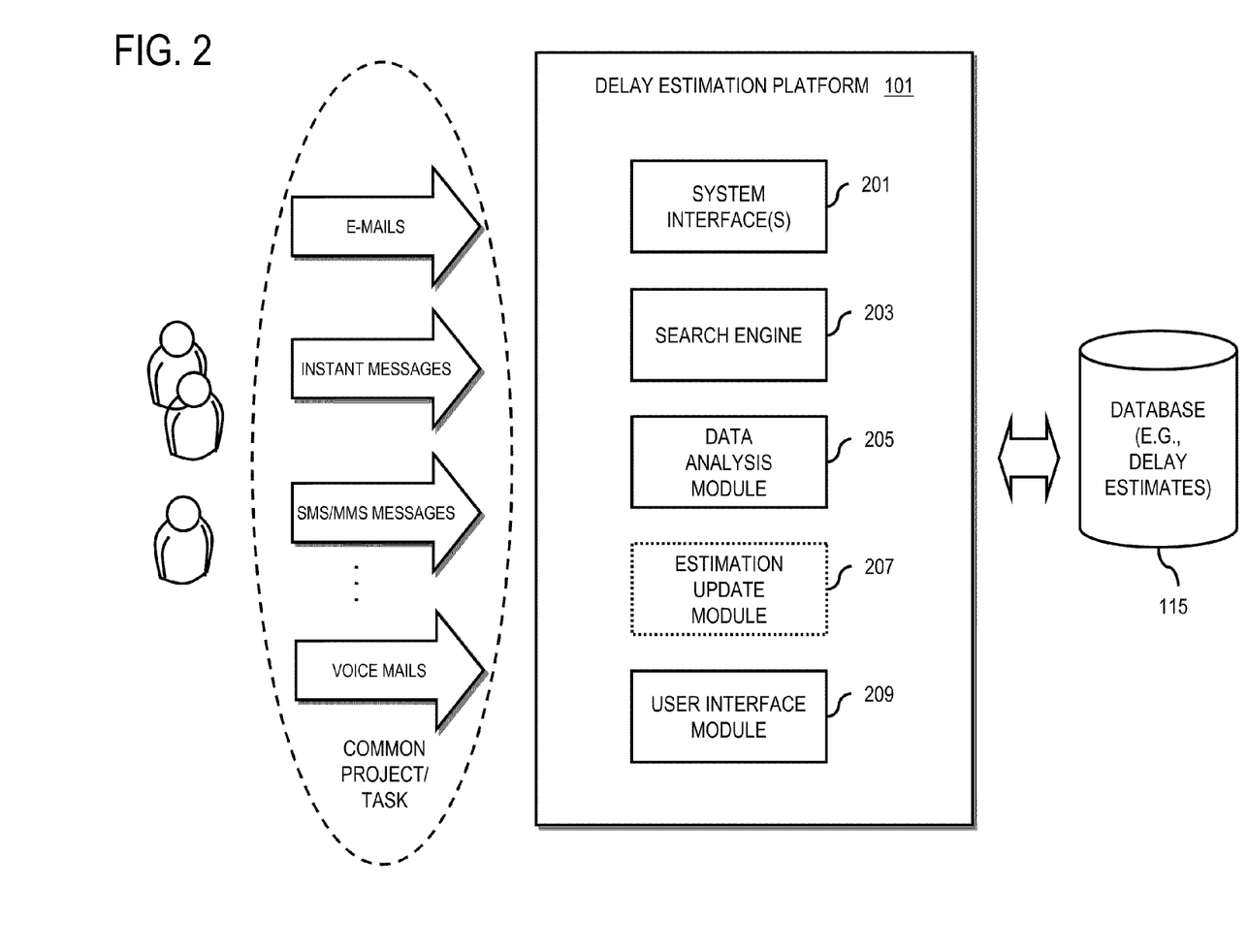
FIG. 2 is a diagram of components of a delay estimation platform, according to an exemplary embodiment.

FIG. 2 is a diagram of components of delay estimation platform 101 of FIG. 1, according to an exemplary embodiment. In this exemplary embodiment, delay estimation platform 101 includes system interface(s) 201, search engine 203, data analysis module 205, optional estimation update module 207, and user interface module 209.

According to certain embodiments, one or more system interfaces 201 can be configured to provide interface with electronic communication systems (such as e-mail system 103, instant messaging system 105, messaging system 107, etc. of system 100), project management system 109 of system 100, user devices 111a-111n of system 100, and/or systems engaged in projects. Further, the one or more system interfaces 201 in association with the search engine 203 are configured to perform necessary searches and categorizations of different time based transactions provided by the different systems mentioned above. For example, for a given individual engaged in a project, which estimate completion time is to be calculated, the system interface 201 and the search engine 203 can access the e-mail system 103 (which can, for example, include an e-mail exchange server) of system 100 and perform a search to determine e-mails associated with one or more individuals involved with the common project/task. Following with this example, the system interface 201 in association with the search engine 203 can further categorize and group the result e-mails based on, for example, sender/receiver, subject, sent/received times, etc. The searched and categorized e-mails can be further used by the data analysis module 205 to determine response times for that individual by, for example, data mining of time stamps associated with the e-mails.

According to another example, the system interface 201 and the search engine 203 can access the project management system 109 of system 100 to access to and search for information data associated with previous projects. In this manner, the system interface 201 in conjunction with the search engine 203 can search and categorize information data for the individual in previous projects, such as electronic communications involving the individual. In this exemplary embodiment, the data analysis module 205 can further utilize the accessed, searched, and categorized information data to compute, for example, average project dependency parameter for the individual, average number of electronic communications for the individual per project, average estimated time period for that individual to complete a task and/or project if all information needed for that individual is available, etc.

As another example, the system interface 201 can also access other systems (e.g., social networking services, websites, etc.) that are engaged in the project to determine timing data. The timing data can be further processed by the data analysis module 205 to determine the delays, and ultimately yield an estimate of the completion time.

As noted, the data analysis module 205 can perform a variety of computations and analysis to correlate the collected timing data to a common task and corresponding members. In one exemplary embodiment, the data analysis module 205 is configured to calculate average background delay periods for systems and/or individuals involved in a project. The average background delay periods can be determined based on computed response times of these systems and/or individuals (for example, computed by the data analysis module 205). Further, the data analysis module 205 can determine ranges of delay periods, determine the smallest and largest background delay periods, provide graphs of background delay periods, perform additional statistical analysis on response times and/or background delay periods, etc.

According to one exemplary embodiment, the data analysis module 205 can further account for various factors associated with previous projects in the determination of the delay data. These factors, which can include, for example, project dependency parameters for systems and/or individuals engaged in the project, average number of electronic communications and/or services per project, etc., are determined based on information data accessed from, for example, project management system 109 of system 100 by system interface 201 and/or search engine 203. Alternatively or additionally, the information data associated with the prior projects can be stored in the database 115 of system 100 and be accessed by the delay estimation platform 101 through a query function. Also, the data analysis module 205 can determine, access, and/or receive estimated time periods, for individuals and/or system engaged in the project, to complete the project if all necessary information is provided to them (therefore, an estimate time period without considering background delay periods).

The data analysis module 205 can use one or more of average background delay periods, project dependency parameters, average number of electronic communications, estimated time periods (without delays) to complete the project, etc. to determine the estimated completion time for the project with high accuracy.

In one exemplary embodiment, the optional estimation update module 207 is configured to update the estimated completion time of the project. As noted, an update procedure performed by the estimation update module 207 can be initiated based on required periodical updates, received information regarding changes to parameters of the project (such as systems and/or individuals engaged in the project), updated parameters and factors computed to determine the estimated completion time, etc.

According to another exemplary embodiment, the delay estimation platform 101 may include the user interface module 209. The user interface module 209 is configured to control and operate a graphical user interface that provides an environment to provide the estimated completion time for the current project, update systems and/or individuals engaged in current project, etc. As noted above, the graphical user interface, controlled and operated by the user interface module 209 can be displayed at one or more user devices (such as user devices 111a-111n of system 100). An exemplary user interface is more fully described below with respect to FIG. 3.

Figure 3:
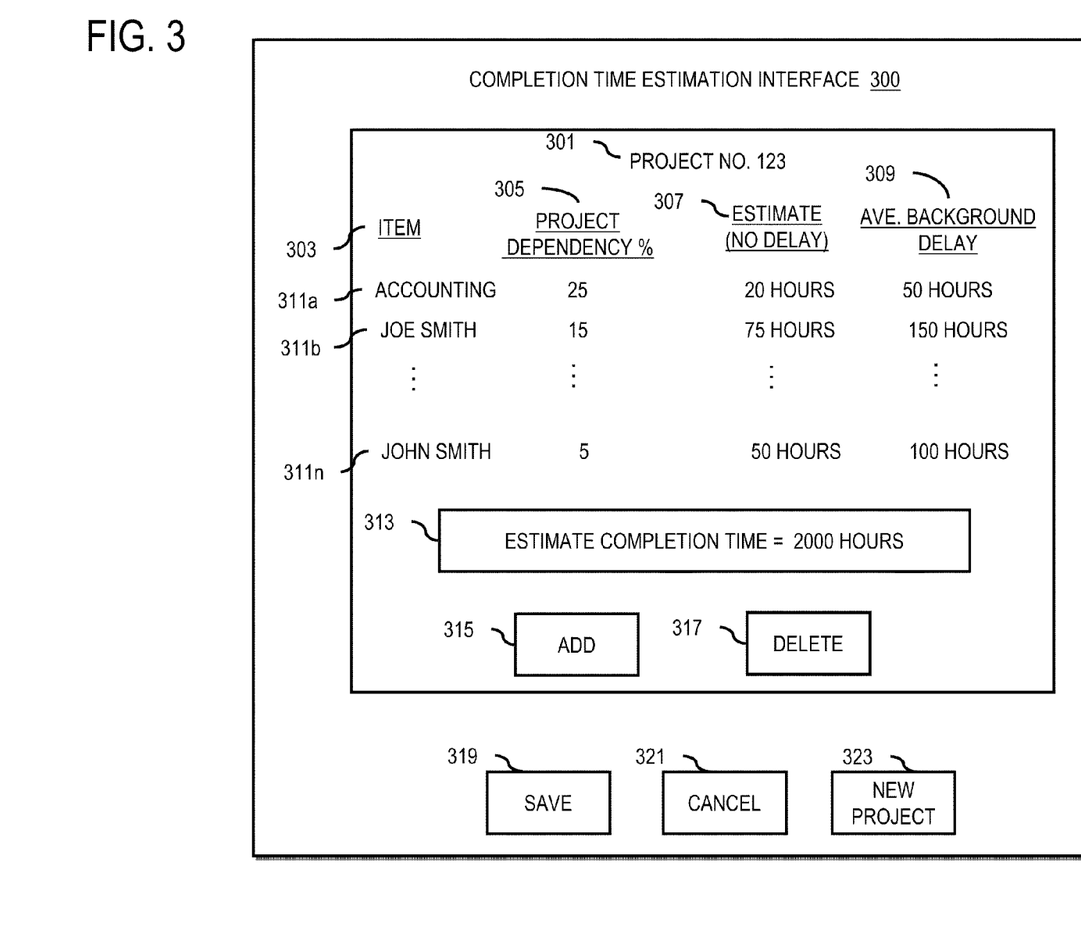
FIG. 3 is a diagram of a completion time estimation graphical user interface (GUI), according to an exemplary embodiment.

FIG. 3 is a diagram of a completion time estimation graphical user interface (GUI), according to an exemplary embodiment. In one embodiment, the completion time estimation graphical user interface 300 can be controlled and operated by the user interface module 209 of the delay estimation platform 101 of FIG. 2. For illustration purposes, the completion time estimation graphical user interface 300 can include and display information regarding a project that the estimated completion time is calculated.

In the exemplary embodiment of FIG. 3, the graphical user interface 300 includes a project name 301 for which the estimated completion time is computed. As illustrated, the completion time estimation graphical user interface 300 can include an item 303 that can include the systems and/or individuals engaged in the project 301. Also, the completion time estimation graphical user interface 300 can include a project dependency percentage icon 305 that represents the project dependency parameter associated with each system and/or individual, which is calculated by the delay estimation platform 101. Further, the graphical user interface 300 can include an estimate (no delay) icon 307, which characterizes an estimated time period for each item (system and/or individual) to complete its portion of the project if all information needed is available (without considering background delays).

For illustration purposes, the completion time estimation graphical user interface 300 can include the average background delay icon 309 that signifies average background delay period computed for each item. Although these exemplary icons are illustrated in FIG. 3, it is contemplated that any other variable or factor determined and/or computed by the delay estimation platform 101 can be presented on the completion time estimation graphical user interface 300. Data lines 311a-311n present items (systems and/or individuals) engaged in the project 301 with their associated determined dependency variable, estimated time period to complete their portion without background delays, and average background delays. In one exemplary embodiment, the information data associated with the items presented on data lines 311a-311n are determined by the delay estimation platform 101. Alternatively or additionally, the interface 300 can offer the user of the completion time estimation graphical user interface 300 a capability to edit the information data.

Further, the completion time estimation graphical user interface 300 can include a text box 313 that displays the estimated completion time of the project calculated by the delay estimation platform 101. Also, the completion time estimation graphical user interface 300 can include one or more user interface components 315 and 317 to add or delete, respectively, items (such as systems and/or individuals) to the project 301.

The completion time estimation graphical user interface 300 can also include one or more interface components 319, 321, and 323. A user of the completion time estimation graphical user interface 300 can use the interface components 319 and/or 321 to save and/or cancel any changes that may have been made to the project 301. Also, the user of the completion time estimation graphical user interface 300 can further begin a completion time estimation process for a new project using the interface component 323.

It is noted that the completion time estimation graphical user interface 300 illustrated in FIG. 3 is a representative illustration of a graphical user interface and the interface 300 can include different components and functions.

Figure 4A:
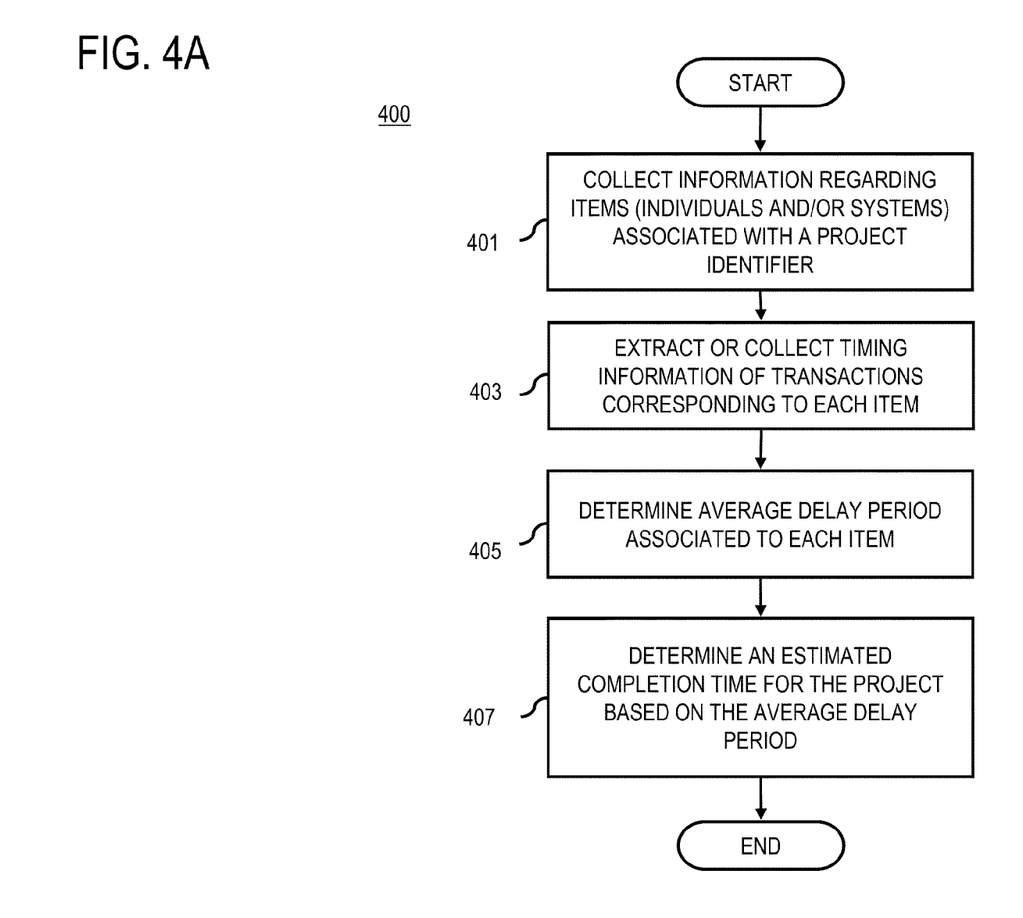
FIGS. 4A and 4B are flowcharts of processes for determining estimate completion time for projects, according to various exemplary embodiments.
Figure 4B:
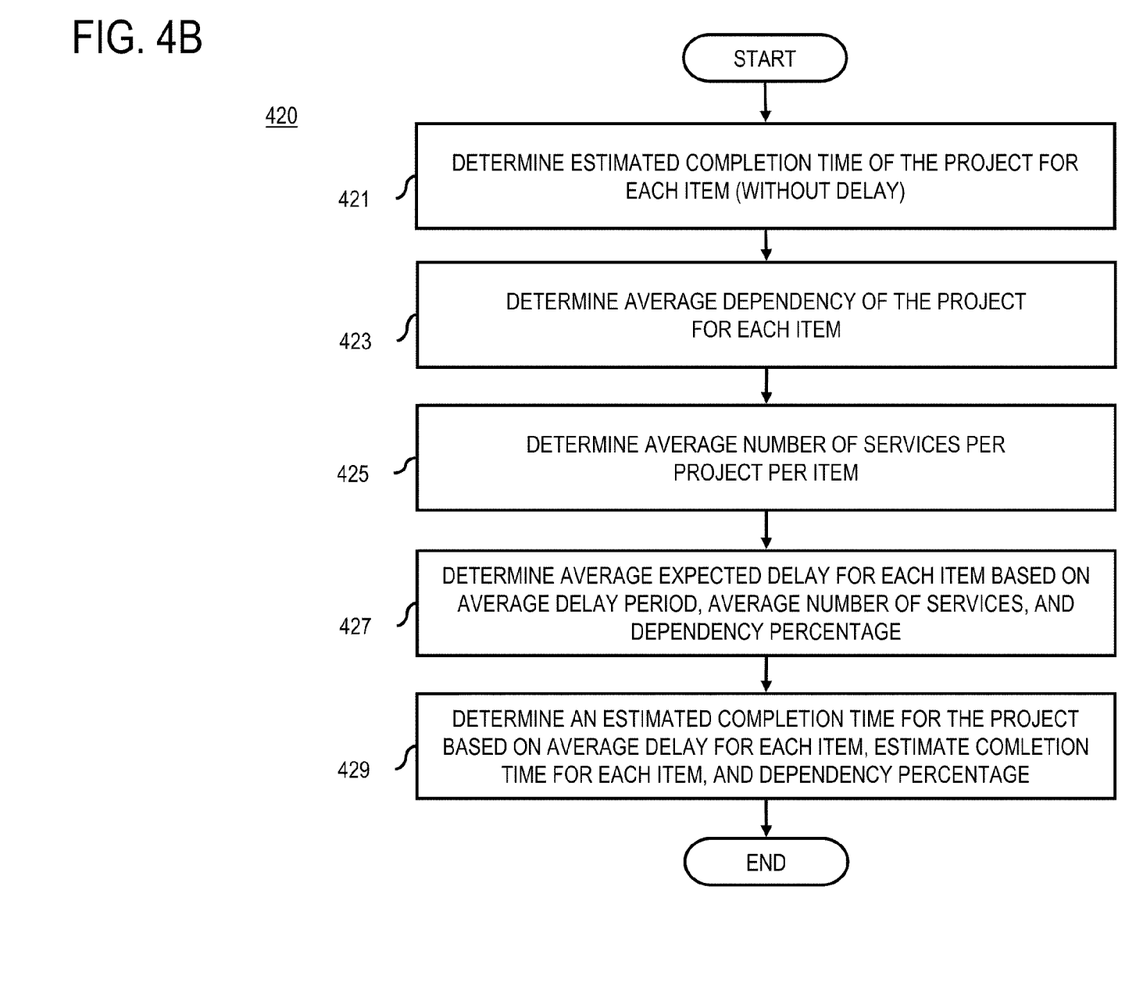

FIGS. 4A and 4B are flowcharts of processes for determining estimated delay value (or completion time) for projects, according to various exemplary embodiments. In one embodiment, process 400 of FIG. 4A can be performed at delay estimation platform 101. At step 401, the process 400 collects information (e.g., electronic communications) regarding an item identifier (e.g., individuals and/or systems) involved with a project—i.e., associated with a project identifier. In one exemplary embodiment, the information can be collected from project management system 109 of FIG. 1. It is noted this information can be any data of a temporal nature that can be correlated to a particular task or project identifier. At step 403, timing information corresponding to transactions associated with the individuals and/or systems are collected or extracted from the collected information in step 401. That is, the electronic communications can be signaling messages that include the actual timing information; alternatively, the electronic communications are either e-mail messages, instant messaging messages, or SMS/MMS messages. As noted, the timing information can be collected based on time stamps associated with the transactions. In one exemplary embodiment, the transactions can include electronic communications of individuals engaged in the project and/or time based transactions performed by systems involved in the project.

At step 405, an average delay period associated with each individual and/or system engaged in the project is determined, in part, based on collected timing information. As mentioned, the determined average delay period can include average background delay period. At step 407, an estimated delay value (or estimated completion time) for the project is determined. This determination can be, in part, based on the determined average delay period for each individual and/or system. Therefore, process 400 can determine an estimated completion time of a project with more precision by taking into consideration average delay periods for individuals and/or systems engaged in the project.

Process 420 of FIG. 4B illustrates step 407 of process 400 of FIG. 4A with additional details and can also be performed at delay estimation platform 101. According to exemplary embodiment of process 420, additional information (in addition to average delay period associated with individuals and/or systems—as determined at step 405 of process 400) is used to determine the estimated completion time of the project.

At step 421, the process 420 collects and/or determines estimated completion time for individuals and/or systems if all the necessary information were available to them (without considering any delay). In one exemplary embodiment, this estimate can be collected and/or determined based on previous projects that involved the individual and/or the system. Alternatively or additionally, the estimate can be provided by a user (such as a manager). At step 423, an average project dependency parameter can be determined. The average project dependency parameter represents the average dependency of the project to each of the individuals and/or systems.

At step 425, for each individual and/or system, average number of services per project is determined. In one exemplary embodiment, the average number of services can include average number of electronic communications (such as e-mails, instant messages, SMS/MMS, voice messages, voice calls, etc.) for an individual.

At step 427, an average expected delay for individuals and/or systems involved in the project is calculated. In one exemplary embodiment, in order to determine the average expected delay for each item, at step 427, the average project dependency parameter of that item (computed, for example, at step 423), the average number of services for that item (determined, for example, at step 425), and average delay period of that item (determined, for example, at step 405 of process 400) are multiplied.

At step 429, the estimated completion time (including delays) for the project is determined. In one exemplary embodiment, at step 429, first, estimated completion time for each individual and/or system (assuming all necessary information is available—not considering delay—as determined, for example, at step 421) is multiplied by the average project dependency parameter for that item. Thereafter, this computed factor is then added to average expected delay for that item (determined, for example, at step 427) to generate estimated completion time for the project. According to certain embodiments, the estimated completion time can be determined for each individual and/or system engaged in the project and the determined estimates can be summed to generate estimated completion time for the project.

The above process is illustrated in Table 1 in the context of communications involving e-mails, whereby the average delay time is computed:

TABLE 1

1. Collect/determine a list of the people/systems that will be involved in the project: (collection of items)
2. Compute the average email and other service/system turnaround times per item on the list:
(summation of all delays per item/total number of events per item)
3. Enter an estimate for how long to complete the project (assuming necessary information is available):
(how long for individual)
4. Refer to past projects for the total volume of back/forth projected for this current project:
(total volume of past emails/total past number of projects) (total email count per project)
5. Enter estimate of what fraction the project depends on each item on the list:
(total email count per project/number of collection of items per project)
6. Output estimate of background delay time using these values for each item on the list.
7. Determine how long for each item on list as individual:
(item project dependency percentage * how long for individual)
8. Determine how long for expected delays:
(item project dependency percentage * total email per item * average item delay per email exchange)
9. Determine how long for entire project:
(individual estimate per item + expected delays per item)

The above exemplary scheme involves determining a user identifiers and/or system identifiers associated with a project. Based on this "items list," electronic mail messages associated with the identifiers are retrieved, e.g., e-mail system 103 of FIG. 1. For each of the identifiers, timing information is extracted from the electronic mail messages attributable to the respective identifier. Also, for each of the user identifiers, the process computes an average delay value based on the corresponding extracted timing information. Other factors or data can be utilized as well. For instance, the process can collect information corresponding to a past projects associated with the identifiers. The average number of electronic mail messages per project associated with a respective identifiers is determined based on the collected information corresponding to the past projects. Further, the process determines, for each of the user identifiers, a project dependency parameter specifying degree of dependency of the project on a user associated with the respective user identifier. The estimated delay value is based in part on the determined average project dependency parameter and the average number of electronic mail messages per project.

The described implementations and processes, according to certain embodiments, advantageously provide a more accurate estimation for time needed to complete a task and/or a project by, for example, considering background delays and turnaround times, analyzing previous projects, etc.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
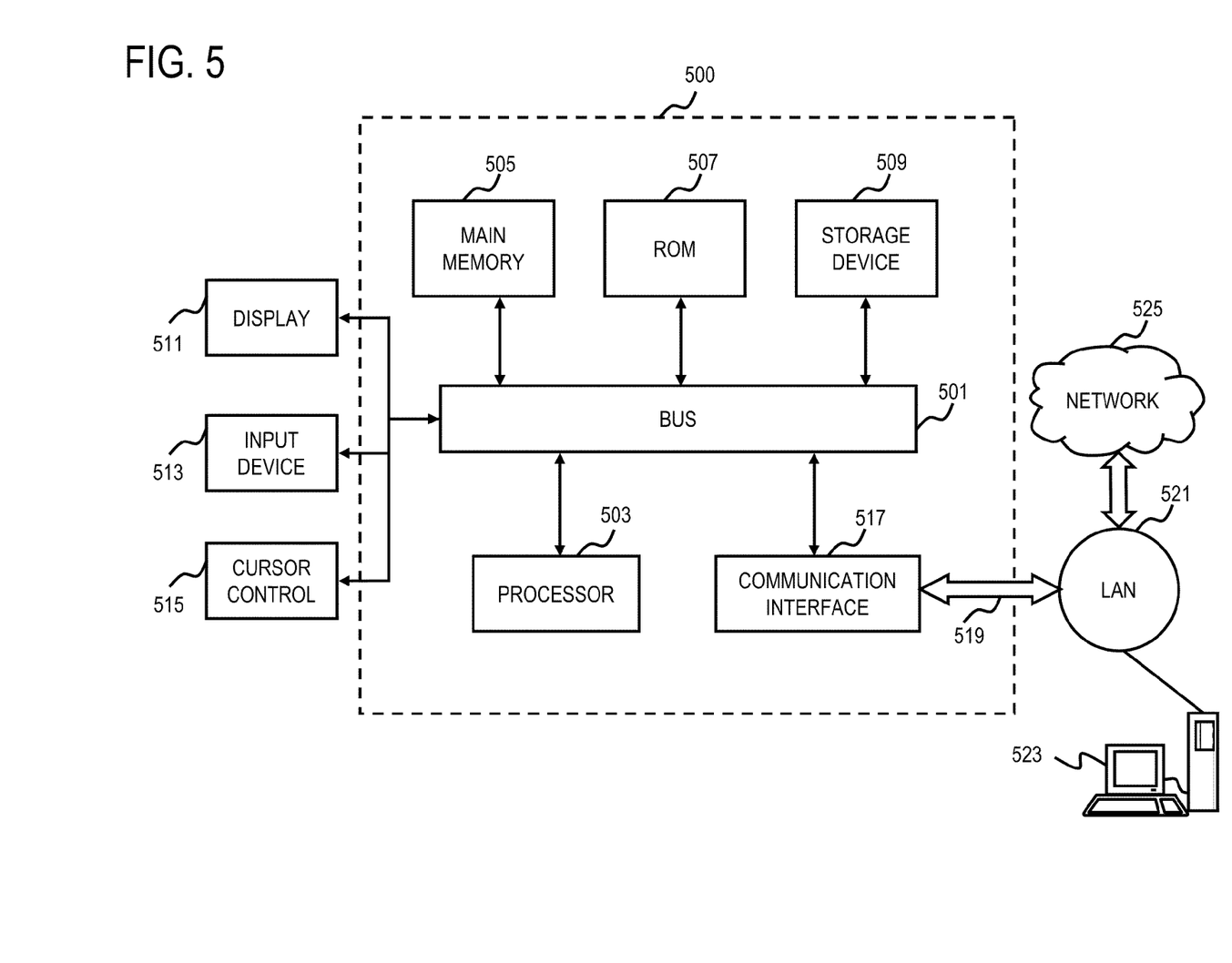
FIG. 5 is a diagram of a computer system that can be used to implement various exemplary embodiments.

FIG. 5 illustrates computing hardware (e.g., computer system) upon which an embodiment according to the invention can be implemented. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions (or computer program code) by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
accessing, in a storage device, a database of a plurality of electronic communications of a plurality of users, wherein the plurality of users are engaged in a common project and the electronic communications relate to the common project engaged in by the users;
extracting, with a processor, timing information from the electronic communications;
computing, with the processor, for each of the users, an average delay period using the extracted timing information; and
generating, with the processor, an estimated delay value for the project based on the computed average delay periods,
the method further comprising:
collecting information corresponding to a plurality of past projects of the users;
determining an average number of electronic communications per project associated with a respective one of the users based on the collected information corresponding to the plurality of past projects; and
determining a project dependency parameter specifying degree of dependency of the project on the user, wherein the estimated delay value is based in part on the determined average project dependency parameter and the average number of electronic communications per project associated with a respective one of the users.

2. A method of claim 1, further comprising:
categorizing the plurality of electronic communications based on at least one of a sender, a receiver, a subject, a received timing information, and a sent timing information.

3. A method of claim 1, wherein the electronic communications is further associated with processes.

4. A method of claim 1, wherein the plurality of electronic communications include at least one of e-mail communication, instant messaging, short message service, or multimedia messaging service.

5. A method of claim 4, further comprising:
initiating communication with a plurality of communication systems that include an e-mail system, an instant messaging system, a short message service/multimedia message service system; and
storing the electronic communications.

6. An apparatus comprising:
a processor configured to initiate access of a plurality of electronic communications of a plurality of users, wherein the plurality of users are engaged in a common project and the electronic communications relate to the common project engaged in by the users, and the processor is further configured to extract timing information from the electronic communications; and
a memory coupled to the processor and configured to store the extracted timing information, wherein the processor is further configured to compute, for each of the users, an average delay period using the extracted timing information, and to generate an estimated delay value for the project based on the computed average delay periods,
wherein the processor is further configured to collect information corresponding to a plurality of past projects of the users, and to determine an average number of electronic communications per project associated with a respective one of the users based on the collected information corresponding to the plurality of past projects, and
wherein the processor is further configured to determine a project dependency parameter specifying degree of dependency of the project on the user, wherein the estimated delay value is based in part on the determined average project dependency parameter and the average number of electronic communications per project associated with a respective one of the users.

7. An apparatus of claim 6, wherein the processor is further configured to categorize the plurality of electronic communications based on at least one of a sender, a receiver, a subject, a received timing information, and a sent timing information.

8. An apparatus of claim 6, wherein the electronic communications is further associated with processes.

9. An apparatus of claim 6, wherein the plurality of electronic communications include at least one of e-mail communication, instant messaging, short message service, or multimedia messaging service.

10. An apparatus of claim 9, wherein the processor is further configured to initiate communication with a plurality of communication systems that include an e-mail system, an instant messaging system, a short message service/multimedia message service system, the memory being further configured to store the electronic communications.

11. A method comprising:
determining a plurality of user identifiers associated with a project;
retrieving from a database in a storage device a plurality of electronic mail messages associated with the user identifiers;
extracting, with a processor, for each of the user identifiers, timing information from the electronic mail messages attributable to the respective user identifier;
computing, with the processor, for each of the user identifiers, an average delay value based on the corresponding extracted timing information; and
generating, with the processor, an estimated delay value for the project based on the computed average delay values,
the method further comprising:
collecting information corresponding to a plurality of past projects associated with the user identifiers;
determining an average number of electronic mail messages per project associated with a respective one of the user identifiers based on the collected information corresponding to the plurality of past projects; and
determining, for each of the user identifiers, a project dependency parameter specifying degree of dependency of the project on a user associated with the respective user identifier, wherein the estimated delay value is based in part on the determined average project dependency parameter and the average number of electronic mail messages per project associated with a respective one of the user identifiers.

12. An apparatus comprising:
a processor; and
a memory including computer program code, the memory and the computer program code configured to, with the processor, cause the apparatus to perform at least the following,
determine a plurality of user identifiers associated with a project,
retrieve a plurality of electronic mail messages associated with the user identifiers,
extract, for each of the user identifiers, timing information from the electronic mail messages attributable to the respective user identifier,
compute, for each of the user identifiers, an average delay value based on the corresponding extracted timing information, and
generate an estimated delay value for the project based on the computed average delay values,
wherein the apparatus is further caused, at least in part, to:
collect information corresponding to a plurality of past projects associated with the user identifiers;
determine an average number of electronic mail messages per project associated with a respective one of the user identifiers based on the collected information corresponding to the plurality of past projects; and
determine, for each of the user identifiers, a project dependency parameter specifying degree of dependency of the project on a user associated with the respective user identifier, wherein the estimated delay value is based in part on the determined average project dependency parameter and the average number of electronic mail messages per project associated with a respective one of the user identifiers.

* * * * *